United States Patent [19]

Mead

[11] Patent Number: 4,813,807
[45] Date of Patent: Mar. 21, 1989

[54] MEMORY METAL CONNECTOR FOR PANELS

[75] Inventor: Albert R. Mead, Setauket, N.Y.

[73] Assignee: Grumman Aerospace Corporation, Bethpage, N.Y.

[21] Appl. No.: 11,092

[22] Filed: Feb. 5, 1987

Related U.S. Application Data

[62] Division of Ser. No. 779,766, Sep. 24, 1985, Pat. No. 4,679,292.

[51] Int. Cl.$^4$ ............................................. F16B 4/00
[52] U.S. Cl. ...................................... 403/273; 29/447
[58] Field of Search .................... 29/447, 505, 526 R; 264/230, 249; 403/273

[56] References Cited

U.S. PATENT DOCUMENTS

| | | |
|---|---|---|
| 1,635,830 | 7/1927 | Gagnon . |
| 3,093,526 | 6/1963 | Price et al. . |
| 3,174,851 | 3/1965 | Buehler et al. . |
| 3,538,240 | 11/1970 | Sherlock . |
| 3,569,901 | 3/1971 | Connor . |
| 3,622,941 | 11/1971 | Wetmore . |
| 3,708,611 | 1/1973 | Dinger . |
| 3,740,839 | 6/1973 | Otte et al. . |
| 3,783,429 | 1/1974 | Otte . |
| 3,861,030 | 1/1975 | Otte et al. . |
| 3,913,444 | 10/1975 | Otte . |
| 4,022,519 | 5/1977 | Hill . |
| 4,130,621 | 12/1978 | Sugasawara ...................... 29/447 X |
| 4,135,741 | 1/1979 | Albertsen ........................... 29/447 X |
| 4,200,218 | 4/1980 | Koehler ............................. 29/447 X |

*Primary Examiner*—Timothy V. Eley
*Attorney, Agent, or Firm*—Pollock, VandeSande & Priddy

[57] ABSTRACT

An extruded connector has a bifurcated edge with a generally C-shaped cross section for engaging an enlarged edge of an adjacent panel. When changing the temperature conditions surrounding the connector, the bifurcated edge contracts and clamps the enlarged edge of the panel. The structural frame member is fastened to the connector at an edge opposite the bifurcated edge for completing a strong rigid connection between the panel and the frame member.

1 Claim, 1 Drawing Sheet

MEMORY METAL CONNECTOR FOR PANELS

This is a division of application Ser. No. 779,766, filed Sept. 24, 1985, now U.S. Pat. No. 4,679,292.

BACKGROUND OF THE INVENTION

In the construction of aircraft, fuselage and skin panels must be connected to aircraft frame structures. Traditionally, this has been done by means of rivets. In order to strengthen these skin panels as well as reduce their weight and radar cross section, they have been fabricated from advanced composite materials, such as graphite and epoxy. Such a composite is made up from epoxy impregnated graphite fibers, and during panel assembly the boring of rivet holes in such materials weakens the fiber structure and decreases the composite panel strength and fatigue resistance.

In order to avoid this problem, the prior art has included methods for attaching composite panels to aircraft frame structures which involve expensive adhesive bonding. Although adhesives have been formulated to perform satisfactorily, the expense is considerable and the attachment procedures are time consuming. Accordingly, it is desirable to provide the aircraft industry with a more expeditious and inexpensive means for connecting composite panels than currently available.

BRIEF DESCRIPTION OF THE PRESENT INVENTION

The present invention utilizes connectors fabricated from memory metal alloys to achieve a clamping connection between advanced composite materials and structural frame members.

Memory metal alloys are currently available and typically include brass alloys with high yield strength of over 50,000 psi, and Ni-Ti alloys of over 100,000 psi. The inventive connector may be characterized as an extruded rail of memory metal alloy having an elongated flange which is appropriately connected to an aircraft frame structure while a free bifurcated edge is thermally deformed to engage and clamp a mating enlarged edge of a composite panel. Upon thermal deformation of the memory metal rail, the enlarged edge of the panel becomes securely clamped within the bifurcated edge of the memory metal connector to ensure a strong, sealed and a more fatigue-resistant connection achieved in an expedient and inexpensive manner. Accordingly, the present invention offers a superior alternative to riveting or adhesive bonding as practiced by the prior art.

It is to be emphasized that, although the present invention is discussed in terms of application to aircraft, the invention is not so limited. The connection device of the present invention has wide application for connecting panel-like members to frame support members of various types.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
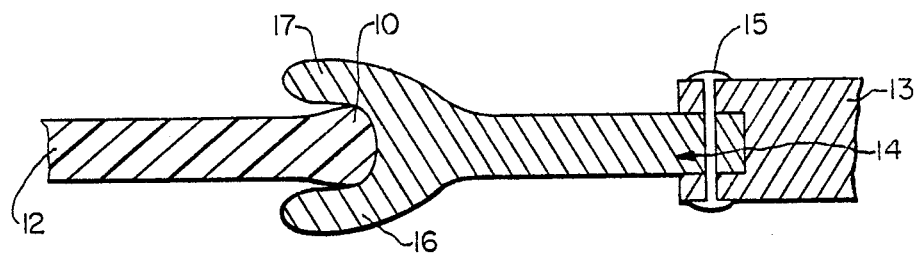
FIG. 1 is a cross-sectional view of the present invention indicating the positional relationship between a panel and a structural member to which the panel is to be connected via the connection device of the invention.

Referring to FIG. 1, a section of an aircraft skin panel 12 is illustrated. Typically, such a panel may be fabricated from layers of a graphite-epoxy composite material built up from overlaying layers of composite fabric. Such materials are commercially available from sources such as CIBA-GEIGY or Hercules Corp. and have been used extensively in the fabrication of aircraft skin panels. Of significance to the invention is the enlarged buildup of panel 12 at flared edge 10 to resemble a bulbous enlargement in cross section. This edge 10 forms a first mechanical connection means for achieving the purposes of the invention. The extruded rail 14 is fabricated from memory metal alloy and achieves a connection between the aircraft skin panel and the structural frame members.

In securing an aircraft skin panel 12 to a structural frame member 13, the present clamping connector 14 is positioned between the panel 12 and the frame member 13. More specifically, the connector 14, which may be characterized as an extruded rail, has the right-illustrated edge connected to the frame member 13 by suitable fasteners such as rivets 15. The opposite end of the connector 14 is bifurcated and includes elongated tines or flanges 16 and 17 having a C-shaped cross section for engaging the enlarged edge 10 of panel 12. As previously explained, the connector 14 is fabricated from a commercially available memory metal alloy and manufactured by a number of sources including Ray-Chem, Ltd., of London, England, and Memory Metals, Inc., of Stamford, Conn. These metal alloys are typically brass alloys with high yield strength of 50,000 psi or may include Ni-Ti alloys having high yield strengths in excess of 100,000 psi. Typically, memory metal alloys assume a first dimensional state in a first temperature range and, depending upon the alloy training, will shrink or expand when subjected to temperatures outside the normal temperature range. Accordingly, the deformation of the 16 and 17 is possible by subjecting an appropriate memory metal to temperature conditions which will achieve contraction.

Figure 2:
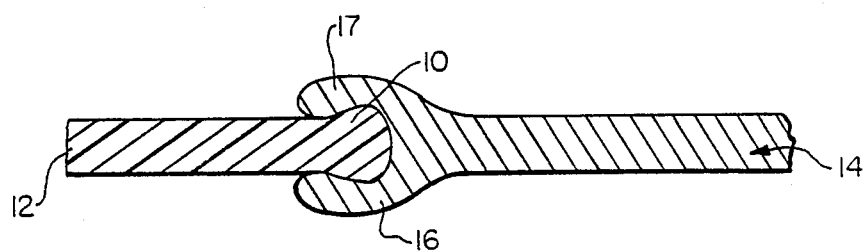
FIG. 2 is a cross-sectional view similar to that of FIG. 1 but illustrating the inventive connection device in its secured connection after thermal deformation.

To initiate assembly, the connector 14 is positioned between the panel 12 and frame member 13 as shown in FIG. 1. The tines 16 and 17 are maintained in an expanded state by exposing the memory metal alloy connector 14 to sufficiently low temperature. Upon engagement between the enlarged edge 10 and tines 16 and 17, the connector 14 is heated, which causes the memory metal alloy to contract thereby resulting in the clamping of the enlarged edge 10 between tines 16 and 17, as shown in FIG. 2. A memory metal alloy connector will maintain its strong clamping pressure on the panel 12 thereafter through the normal operating temperatures of an aircraft. The rivet connection shown in FIG. 1 may be replaced by employing a second bifurcated edge on the right side of connector 14 if the confronting frame member edge is flared as is the enlarged edge 10 of panel 12. The result of the metal deformation, as shown in FIG. 2, resembles the result that would be achieved by forging.

Connector 14 may be formed by extrusion or, alternatively, may be formed integrally with the structure frame; and the bifurcated end of the connector 14 may be configured to accommodate a wide variety of curvatures on edge 10.

In summary, the present invention utilizes memory metal alloys in a new fashion, namely, as a material for a rail-like connector which is thermally deformed along one edge thereof to clamp the mating edge of a panel, while an opposite edge of the connector is fastened to a structural frame member. This avoids the necessity of expensive and time-consuming prior art adhesive bonding between a panel and structural member. The invention is also superior to the utilization of prior art rivet fastening between panel and structural members which, in the event of fiber-containing composite panel materials, evidences a severing of the fibers when rivet holes the formed which reduces the strength of the composite material.

It should be understood that the invention is not limited to the exact details of construction shown and described herein for obvious modifications will occur to persons skilled in the art.

I claim:

1. A combination of a connection of two structural members, and comprising:
    a bifurcated edge fabricated from memory metal alloy extending from a first structural member and having an interior surface of generally C-shaped cross section defining two extended flanges of arcuate cross section; and
    an elongated mating edge extending from a second member, the mating edge being of bulbous cross section and received within the arcuate flanges which contract during a preselected temperature change for clamping the bulbous mating edge along the entire length thereby securing the two members together.

* * * * *

UNITED STATES PATENT AND TRADEMARK OFFICE
CERTIFICATE OF CORRECTION

PATENT NO.   :   4,813,807
DATED        :   March 21, 1989
INVENTOR(S) :   Albert R. Mead It is certified that error appears in the above-identified patent and that said Letters Patent is hereby corrected as shown below:

Column 2, line 47, before "16 and 17" insert --tines--.

Column 3, line 18, change "the" (first occurrence) to

--are--.

Signed and Sealed this

Tenth Day of October, 1989

Attest:

DONALD J. QUIGG

Attesting Officer

Commissioner of Patents and Trademarks